July 26, 1955

R. A. SUTHANN 2,713,986

SELF-ALIGNING POPPET VALVE

Filed March 30, 1953

INVENTOR.
ROBERT A. SUTHANN
BY
ATTORNEYS

United States Patent Office 2,713,986
Patented July 26, 1955

2,713,986

SELF-ALIGNING POPPET VALVE

Robert A. Suthann, Burbank, Calif., assignor to Hydro-Aire, Inc., Burbank, Calif., a corporation of California Application March 30, 1953, Serial No. 345,546

3 Claims. (Cl. 251—86)

This invention relates to poppet valves, and particularly to a poppet valve constructed to automatically align itself relative to a valve seat and provide a substantially perfect valve seal regardless of wear, imperfections in construction, and other factors.

In conventional poppet valve structures, and especially in poppet valves of the type designed to control fluids under relatively high pressures, it is necessary to accurately machine the various valve surfaces, as well as the valve stem and related parts, in order to achieve the necessary degree of sealing when the valve is closed. Furthermore, even with precision machining of the valve components the desired seal is frequently not present after the valve has been in use for a substantial length of time since wear of the valve seat or poppet may cause misalignment, lack of concentricity, and other factors resulting in leakage. In addition to creating leakage the excessive wear on the poppet and seat may disrupt the operation of the valve, for example when the valve is of a balanced type and it is necessary that the various sealing diameters be maintained constant.

In view of the above problems characteristic of the field of poppet valves, it is an object of the present invention to provide a self-aligning valve adapted to automatically maintain itself in the desired sealing relation relative to the valve seat regardless of wear, initial misalignment of the valve components, or other factors.

Another object of the invention is to provide a self-aligning poppet designed to engage the seat therefor in a cushioning action which materially reduces the wear on a poppet and seat and in addition tends to enhance the self-aligning operation of the valve.

Another object of the invention is to provide an effective valve which is relatively inexpensive and simple to manufacture and assemble.

These and other more specific objects will appear upon reading the following specification and claims, and upon considering in connection therewith the attached drawing to which they relate.

Figure 1:
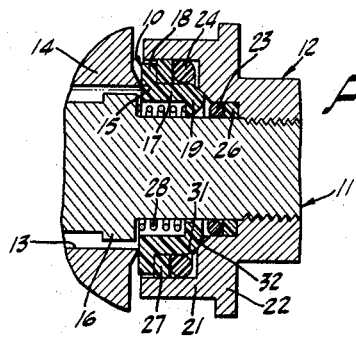
Figure 1 is a fragmentary longitudinal central section of a poppet valve embodying the present invention.

Referring to the drawing, each of the eight embodiments of the present invention comprises a poppet ring 10 mounted over a stem 11 and normally held in position by a back-up ring 12 which is threaded over the outer portion of the stem. The stem 11 is normally cylindrical in shape and extends into a corresponding cylindrical passage 13 in a casing 14, the latter having a seat portion 15 which cooperates with the poppet 10 to provide the valve action. The stem 11 may form part of a balancing arrangement, not shown, permitting actuation of the valve independently of pressures present in the system, or the valve may be of the unbalanced type, such as one in which the poppet is urged toward seated position by a spring engaging the outer portion of back-up element 12.

In all of the embodiments illustrated a stop or seat portion 16 is provided on stem 11 to limit the amount of movement of the poppet away from back-up element 12. Stop 16, which is illustrated in the form of an annular flange, is particularly necessary in the embodiments of Figures 2–6 since these embodiments incorporate spring means tending to urge the poppet away from the back-up for purposes to be described hereinafter.

In the embodiment of the invention illustrated in Figure 1 the poppet ring 10 is formed with a body portion 17 of substantially larger internal diameter than the external diameter of stem 11 at the corresponding location. The body portion 17 is integral at its inner end with a radially and outwardly extending flange 18 having a vertical forward face adapted to sealingly engage the valve seat 15. At the outer end of poppet body 17 is an inwardly extending flange 19 terminating a slight distance from the surface of stem 11, the spacing between the flange 19 and the stem being sufficient to permit a slight amount of rotation or play of the poppet relative to the stem. To prevent rotation or play greater than is necessary to accurately align the poppet 10 relative to seat 15, the back-up element 12 is formed with an outer retaining flange 21 concentric with poppet 10 and extending axially inwardly from the main body portion 22 of back-up member 12. The inner edge portion of retaining flange 21 fits loosely over the outer edge of poppet flange 18 in a manner preventing excessive movement of the poppet while permitting the desired adjustment thereof relative to seat 15.

A pair of O-rings 23 and 24 are provided as shown, and are formed of rubber or other suitable elastomer. These O-rings are normally substantially circular in cross-section but are compressed into a generally rectangular cross-section under the effect of high pressures such as those over 1,000 p. s. i. A pair of retaining rings 26 and 27 are provided, respectively, on the low pressure sides of O-rings 23 and 24. The retaining rings, which are normally rectangular in cross-section and are formed of a suitable soft material such as a synthetic leather, prevent damage to the O-rings as they are distorted by the high fluid pressures. In valves designed to operate at pressures less than 1,000 p. s. i. the retaining rings are eliminated and the valve structure modified accordingly.

O-ring 23 and corresponding retaining ring 26 are disposed in a suitable chamber between stem 11 and back-up element 12 and serve to prevent leakage of fluid along the threads connecting the same. O-ring 24 and cooperating retaining ring 27, which are disposed in a chamber between poppet body 17 and the retaining flange 21 of back-up 12, serve the dual functions of preventing leakage between the poppet and retaining portion 21 and providing a certain amount of resilience which aids in aligning the poppet 10 relative to valve seat 15. A resilient poppet aligning effect additional to that provided by O-ring 24 is created by disposing a helical compression spring 28 in the chamber between poppet body 17 and valve stem 11. Spring 28 seats at its outer end on poppet flange 19, and at its inner end of the stem flange 16, previously described.

According to the invention, the outer end of poppet body 17 and the corresponding adjacent edge of back-up body 22 are formed with cooperating surfaces 31 and 32 which are inclined relative to the axis of stem 11 to permit rotation of the poppet into aligned position. Such aligning rotation of poppet 10 may occur about any transverse axis passing through the axis of stem 11 inwardly of the poppet. A representative axis of rotation for poppet 10 would pass through diametrically opposite portions of the poppet as well as through the axis of stem 11. However, the preferred and most effective axis of rotation lies in substantially the same plane as the outer edge of valve seat 15, and passes through the stem axis. To effect the latter result the surfaces 31 and 32 are preferably made spherical about a point lying on the valve stem axis and in the plane of the valve seat. It is, however, within the scope of the invention for the surface 32 of the back-up element to be conical or slightly concave, and for the poppet surface 31 to be made angular and with a small flat adapted to rock on surface 32.

The O-ring 24 and spring 28 cooperate, when the valve is in open position, to maintain the poppet ring 10 in perfectly aligned position relative to the valve seat. However, any slight poppet misalignment will be corrected upon engagement of poppet 10 with seat 15 during closing of the valve, with the back-up surface 32 then serving to firmly maintain the poppet in seated position. It will be noted that, because of their spherical shape, the cooperating surfaces 31 and 32 do not interfere with the aligning rotation of the poppet as it engages seat 15, which is to be contrasted with the result which would occur if the back-up surface and cooperating poppet surface were perpendicular to the axis of stem 11.

To effect a better sealing action when the valve is in a closed condition, the poppet 10 is preferably constructed of nylon or other suitable plastic. The valve seat 15, which is illustrated as triangular or ridged in cross-section and with a sharp outer edge adapted to engage the poppet 10, will then form a slight groove in the poppet 10 after the valve has remained closed a substantial length of time. This groove will incorporate any slight imperfections in the seat 15 and the valve sealing efficiency will be greatly increased. For certain applications it may be desirable, in order to prevent distortion and warping, to form poppet 10 of metal but with a nylon portion disposed to engage seat 15.

Figure 2:
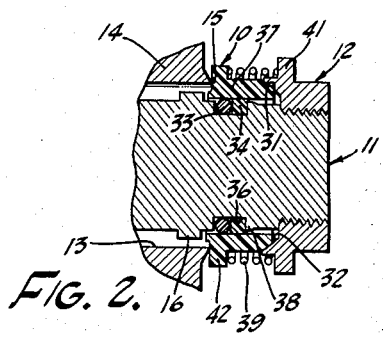
Figure 2 is a corresponding view of a poppet valve embodying means to cushion the engagement of the poppet with the seat therefor.

Referring to Figure 2, a second embodiment of the invention is shown as having a single O-ring 33 and retaining ring 34 to replace both of the O-rings and retaining rings of the previous embodiment. In this form of the invention the O-ring 33 and retaining ring 34 are mounted in an annular groove 36 disposed intermediate the end of the main poppet body 37, the latter extending longitudinally of stem 11 and being spaced a substantial distance outwardly therefrom. As in the case of the previous embodiment, the cooperating surfaces 31 and 32 are provided to permit and facilitate the adjustment and alignment of the poppet 10, in this instance under the influence of the resilient O-ring 33. The aligning is effected and maintained both by the O-ring 33 and upon engagement of poppet 10 with seat 15 during valve closing. A ridge 38 is provided on valve stem 11 to control the retaining ring 34 under pressure, while permitting substantial rotational adjustment of the poppet.

In addition to the self-aligning features discussed above, the embodiment of Figure 2 incorporates means for cushioning the seating of poppet 10 on valve seat 15 during closing of the valve, thereby preventing excessive wear on both the seat and the poppet. The cushioning means comprises a helical compression spring 39 seated between an external flange 41 on back-up element 12 and a corresponding flange 42 on poppet 10. It will be noted that the poppet flange 19 and the retaining portion 21 of back-up member 12 are eliminated in the present embodiment. Because of this change in structure, and because of the elimination of the compression spring 28 previously described, but one O-ring 33 is needed to prevent leakage of fluid through the threaded connection between the back-up element 12 and the stem 11 as well as between the surfaces 21 and 32.

In the operation of the embodiment shown in Figure 2, the shifting of the valve stem 11 to the right to effect opening of the valve will result in disengagement of surfaces 31 and 32 under the influence of compression spring 39, the poppet then being seated on stop flange 16. During return of the valve to closed position, with the stem 11 moving to the left, the inner surface of poppet 10 will first engage seat 15 and tend to align itself relative thereto. Thereafter, the stem 11 will continue its closing motion and the back-up surface 32 will come into engagement with the now stationary surface 31 to complete the closure of the valve. The valve closing is thus cushioned, with the spring 39 absorbing much of the shock inherent in the operation.

Figure 3:
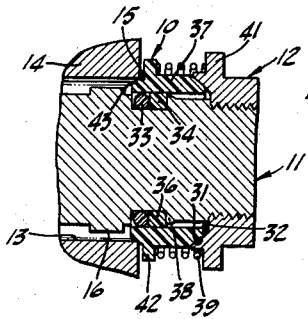
Figure 3 is a poppet corresponding to Figure 2 but having a differently shaped seat and cooperating poppet surface.

The embodiment illustrated in Figure 3 is substantially identical to that described in connection with Figure 2, except that the construction of the valve seat 15 and corresponding portion of poppet 10 are altered. In this form of invention the seat 15 is merely squared and is not ridged or raised, and the cooperating portion of poppet 10 is tapered inwardly to form a conical surface 43 adapted to engage seat 15. The sharp corner of seat 15 operates, as in the case of the previous embodiments, to form a slight groove in the relatively soft poppet 10 to create a substantially perfect sealing action regardless of slight imperfection in the seat or the poppet.

Referring now to the embodiment of the invention shown in Figure 4, the valve is again similar to that described in connection with Figure 2. In the present embodiment, however, the outer portion of poppet stem 11 is illustrated as being of the same depth as the bottom of the groove 36 of the embodiment of Figure 2. The back-up element 12 is then provided with an inner flange or ridge 44 which extends axially inwardly between the main poppet body 37 and valve stem 11 to provide a seat for retaining ring 34. It follows that the outer end of poppet body 37, incorporating the surface 31, is nested between the inner flange 44 and the back-up surface 32.

Figure 4:
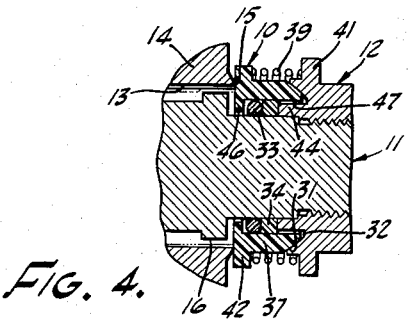
Figure 4 illustrates another embodiment of the invention, wherein the poppet is provided with an inner flange adapted to prevent excessive movement of the poppet element relative to the valve stem.

An additional feature of the embodiment of Figure 4 is the radially and inwardly extending flange 46 formed at the inner end of poppet 10 and extending to adjacent the exterior surface of stem 11. The flange 46 serves both to retain O-ring 33 in position and to aid in preventing excessive rotation or play of poppet 10 relative to stem 11 during opening and closing of the valve. The fit of the inner surface of flange 46 over the poppet stem is sufficiently loose to permit a substantial amount of play of the poppet, and a clearance 47 provided between the back-up flange 44 and the outer poppet end likewise permits adjustment of the poppet 10 relative to the stem. The self-aligning operation of the poppet illustrated in Figure 4, as well as of the poppet of Figure 3, is substantially the same as was described in connection with the embodiment of Figure 2, with both the O-ring 33 and the cushion spring 39 aiding in the adjustment of the poppet to the desired aligned position.

Figure 5:
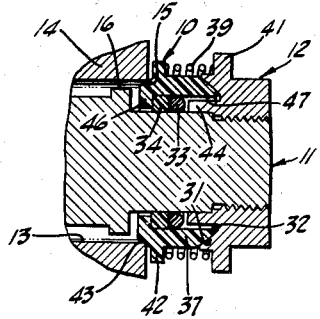
Figure 5 is a poppet corresponding to Figure 4 but assembled to regulate the flow of high pressure fluid from a chamber into a passage, instead of from a passage into a chamber as in the other embodiments illustrated.

Referring next to Figure 5, an embodiment of the invention is illustrated which is assembled for operations wherein the relatively high pressure is in the chamber surrounding the head of the poppet, and the relatively low pressure is within the passage 13. Because of this reversal of the location of the high pressure fluid, the position of O-ring 33 is outwardly of retaining ring 34 instead of inwardly thereof as in the case of the other embodiments of the invention. Except for the fact that the valve seat and cooperating poppet portion is of the type embodying the conical surface 43 as was described in connection with Figure 3, instead of the sharp ridge seat shown and described in connection with the other previously described embodiments of the invention, the structure and operation of the present embodiment is substantially identical to that of Figure 4.

For certain applications, for example when the fluid pressures on both sides of the valve are high, a retaining ring is provided on each side of the O-ring 33.

Figure 6:
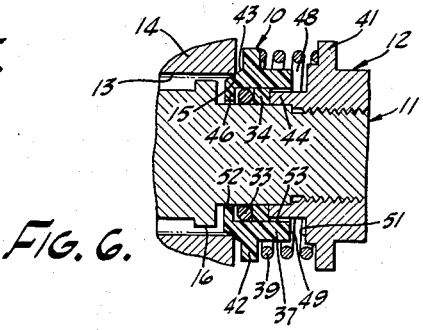
Figure 6 illustrates a further embodiment of the invention, wherein no curved seating surfaces are provided between the poppet and the back-up element therefor.

The poppet valve illustrated in Figure 6 embodies a form of invention wherein the cooperating surfaces 31 and 32 are eliminated and a substantial space 48 is provided between the outer end surface 49 of poppet body 37 and the corresponding surface 51 of back-up ring 12, both of the surfaces 49 and 51 being preferably squared as illustrated. Because of the absence of the cooperating surfaces 31 and 32, the compression spring 39 is made of sufficient strength to stop the closing travel of the poppet head before the engagement of the surfaces 49 and 51 and before the engagement of any similar stop elements. Accordingly, the poppet 10 will be maintained in a floating relationship relative to the seat 15 even when the valve is in closed condition, so that the aligned position which the poppet 10 assumes upon engaging the seat 15 will not be disturbed by the engagement of the squared surfaces 49 and 51. To permit such self alignment of the poppet 10, a substantial clearance 52 is provided between the inner poppet flange 46 and stem 11, and a corresponding clearance 53 is provided between the outer end of poppet body 37 and the inner back-up flange 44.

Referring next to the embodiment of Figure 7, the structure is similar to that described in connection with Figures 4 and 5, with the exception that the cushioning spring 39 is eliminated as are the seating flanges 41 and 42 therefor. In addition, the spherical surface 31 at the outer end of poppet 10 is illustrated as being of somewhat greater extent than in the case of the previously described embodiments. The clearance 47 between the inner back-up flange 44 and the outer end of poppet body 37 is again provided to permit the desired amount of self alignment of poppet 10 as the conical poppet surface 43 engages seat 15, and the fit of poppet flange 46 around stem 11 is likewise sufficiently loose to permit such self-alignment.

Figure 7:
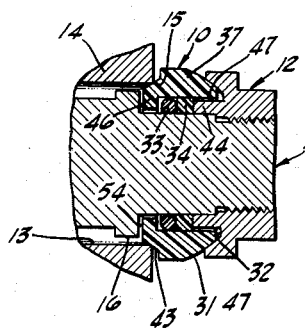
Figure 7 is a self-aligning poppet wherein no spring means are employed.

The poppet valve shown in Figure 7, as in the case of all of the valves embodying the present invention, is assembled with a sufficient clearance, such as the clearance 54 between the inner end of the poppet 10 and the adjacent portion 16 of the stem 11, to permit the desired self alignment.

Figure 8:
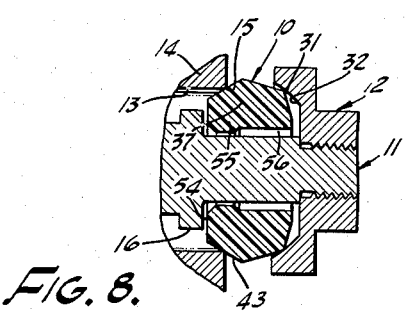
Figure 8 illustrates a poppet employing neither spring means nor sealing element.

In Figure 8 is illustrated an embodiment wherein the cushioning spring 39 is not employed, and the O-ring 33 and retaining ring 34 are likewise eliminated. In this embodiment the main body 37 of poppet 10 is shown as being relatively thick, and the outer end of stem 11 correspondingly reduced in diameter, to permit use of the poppet in connection with a passage 13 of the same diameter as in previous embodiments. To aid in the self-aligning of the poppet, and to enhance the sealing characteristics of the valve without the use of an O-ring, the surface 31 is formed with a ridge as illustrated. This ridge presses against surface 32, when the valve is closed, and forms a seal sufficient to prevent leakage when the fluid pressures are relatively low. The amount of rotation or play of poppet 10 is controlled by a special inner flange or ridge 55 disposed at the inner end of poppet body 37 and of somewhat greater width than the corresponding flange 46 described in connection with the embodiments of Figures 4–7. The clearance 54 is again provided, and a relatively large clearance 56 is provided between poppet stem 11 and the outer portion of poppet body 37. The clearance between flange 55 and the poppet stem, and the clearances 54 and 56, are made sufficiently large to permit self alignment in accordance with the invention.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a self-aligning poppet valve structure, a valve seat, a valve stem mounted adjacent said seat and movable perpendicularly of the plane thereof, a poppet mounted loosely over said valve stem and shaped to sealingly engage said valve seat, a back-up element mounted on said stem on the side of said poppet remote from said seat, said back-up element and said poppet having cooperating surfaces engaging each other when the valve is in closed condition and shaped to permit the poppet to remain in an aligned position relative to said valve seat during and after the closing of the valve, and a compression spring mounted between said poppet and said back-up element and effecting location of said cooperating surfaces in spaced relation when said valve is in open condition, said compression spring permitting said poppet to assume an aligned condition relative to said valve seat upon engaging the same during valve closing and to cushion the engagement of said cooperating surfaces during the valve-closing operation.

2. The poppet valve as claimed in claim 1, wherein an elastomeric O-ring is mounted between said poppet and said stem to prevent leakage of fluid therebetween and to aid in maintaining said poppet in aligned condition.

3. A self-aligning poppet valve structure, comprising a valve casing having a passage therein and a valve seat at one end of said passage, a cylindrical valve stem movably mounted in said passage and protruding from said one end thereof, a poppet ring mounted around the protruding portion of said stem and shaped to sealingly engage said valve seat, said poppet having a first flange extending radially outwardly from the end of said poppet adjacent said seat and a second flange extending radially inwardly from the poppet and remote from said seat, a back-up element mounted on said stem and having a portion disposed adjacent said first flange to prevent excessive movement of said poppet, a helical compression spring disposed inwardly of said poppet and seated between said stem and said second poppet flange, and an O-ring mounted between said first poppet flange and said back-up element, the clearances between said poppet and the adjacent elements being sufficient to permit alignment of said poppet.

References Cited in the file of this patent

UNITED STATES PATENTS

| Number | Name | Date |
|---|---|---|
| 260,397 | Hunter | July 4, 1882 |
| 280,137 | Cooper | June 26, 1883 |
| 783,528 | Kipp | Feb. 28, 1905 |
| 1,413,764 | Mueller | Apr. 25, 1922 |
| 1,431,658 | Hinckley | Oct. 10, 1922 |
| 2,502,279 | Rood | Mar. 28, 1950 |
| 2,561,559 | Brown | July 24, 1951 |
| 2,568,615 | Fischer et al. | Sept. 18, 1951 |
| 2,639,884 | Mitchell | May 26, 1953 |